(No Model.) 3 Sheets—Sheet 1.
G. R. TAYLOR.
ELEVATED AND SUSPENDED CABLE RAILWAY.
No. 402,490. Patented Apr. 30, 1889.
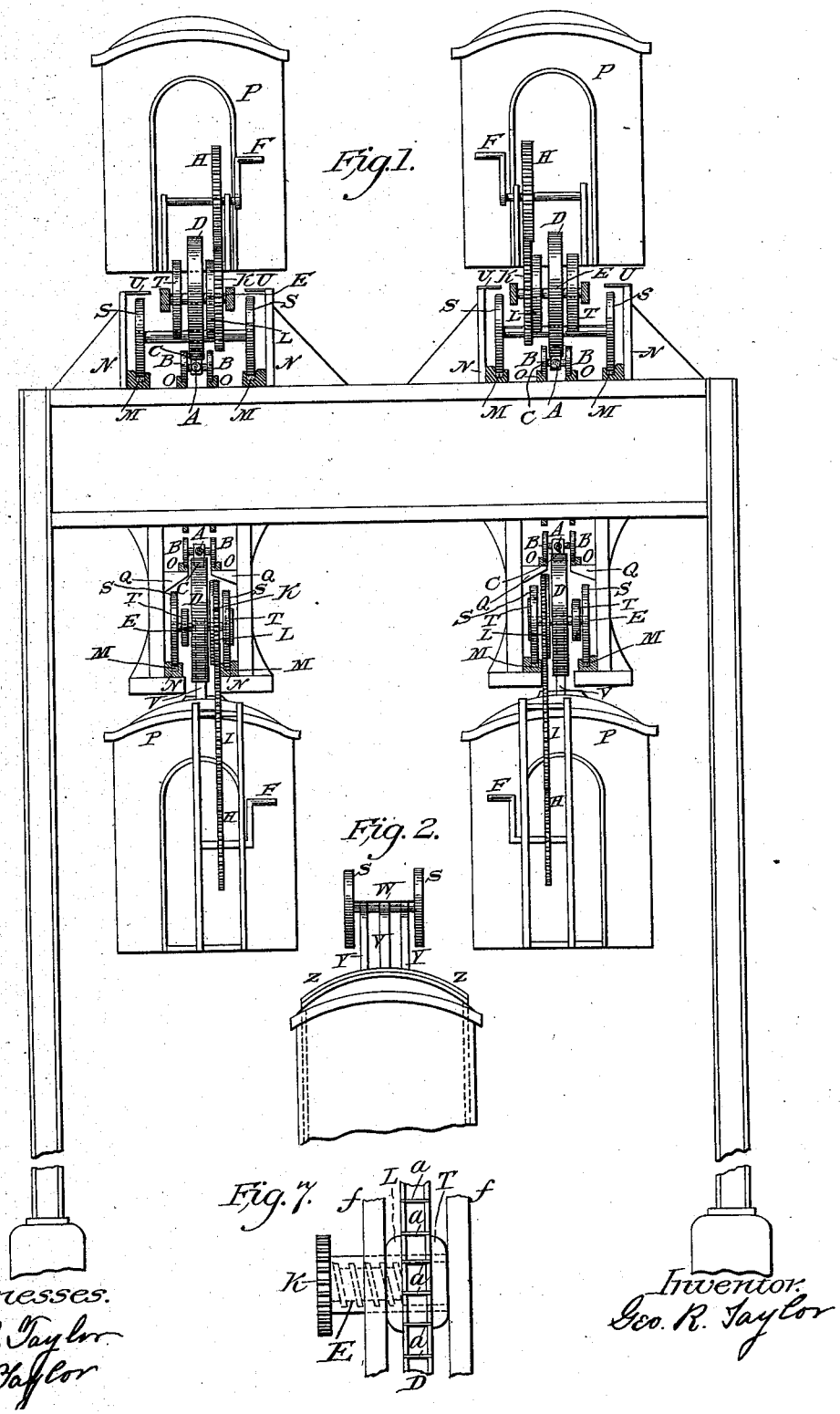

(No Model.)  3 Sheets—Sheet 2.
G. R. TAYLOR.
ELEVATED AND SUSPENDED CABLE RAILWAY.
No. 402,490.  Patented Apr. 30, 1889.
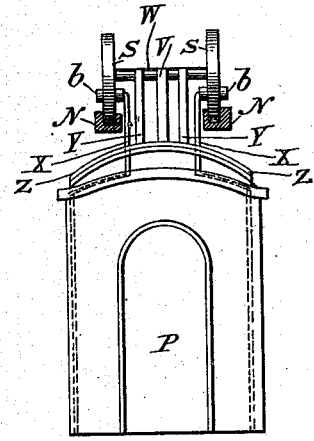
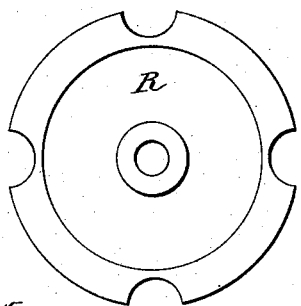
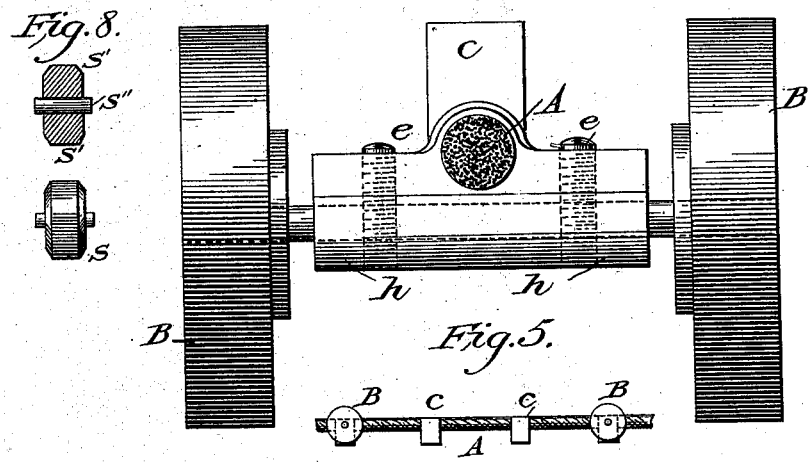
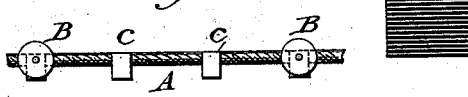
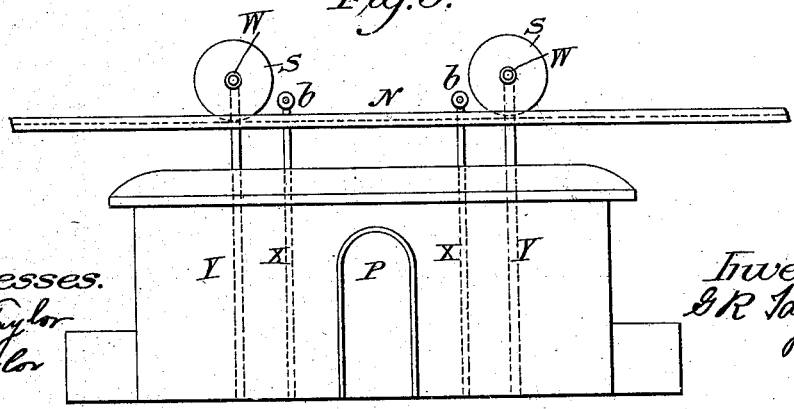
Witnesses.  Inventor.

(No Model.) 3 Sheets—Sheet 3.

G. R. TAYLOR.
ELEVATED AND SUSPENDED CABLE RAILWAY.

No. 402,490. Patented Apr. 30, 1889.

Witnesses
H. B. Taylor
N. L. Taylor

Inventor:
Geo. R. Taylor

UNITED STATES PATENT OFFICE.

GEORGE R. TAYLOR, OF LOUISVILLE, KENTUCKY.

ELEVATED AND SUSPENDED CABLE RAILWAY.

SPECIFICATION forming part of Letters Patent No. 402,490, dated April 30, 1889.

Application filed July 29, 1887. Serial No. 245,645. (No model.)

*To all whom it may concern:*

Be it known that I, GEORGE R. TAYLOR, of the city of Louisville, county of Jefferson, and State of Kentucky, have invented certain new and useful Improvements in Combined Elevated and Suspended Cable Railroads; and I do hereby declare that the following is a full, clear, and exact description thereof, reference being had to the accompanying drawings, and to the letters of reference marked thereon, which form a part of this specification.

Like letters indicate like parts.

Figure 1 represents an end view and side view of my improved combined elevated and suspended cable-railroad system. Fig. 2 represents my improved method of suspending the car. (Not shown in Fig. 1.)

A represents the cable.

B represents the trucks carrying the cable.

C represents the steel clips affixed to the cable.

D represents the capstan or friction-wheel.

E represents the axle on which D runs.

F represents the crank which turns the cog-wheel H.

H in elevated car, Fig. 6, is a cog-wheel which plays into cog-wheel K.

H in suspended cars, Fig. 6, is a cog-wheel which plays into cog-wheel I, which plays into cog-screw K.

K is a small cog-wheel having a screw-shaft and whose motion causes the disk L to touch and press against the capstan-wheel D, and by the friction between them stops the revolution of wheel D gradually and thus gives motion to the car.

L represents the disk. (Its use is explained above.)

M represents space in the groove to be filled with a concrete or composition to deaden noise.

N represents track for car-wheels.

O represents the cable-track.

P represents the car.

T represents a shoulder to hold the large capstan-wheel D in place.

R, Fig. 6, represents the wheel which gives power to the cable.

Fig. 8 represents a section and an end view of a beveled wheel. S' represents the bevel. S" represents the hub.

S represents wheels which carry the car.

Y V Y, Fig. 2, represent rods by which the car is suspended. These rods connect the car with the axle W by means of springs Z Z. In other figures of the drawings only one rod, V, is shown; but three rods, Y V Y, as shown in Fig. 2, will be used.

Z Z are springs on top of car. (Shown only in Figs. 1 and 3.)

X X are iron bands running around the frame of the suspended car and extending up between the rails of the track, then turning out in form of elbows to prevent the car from falling in case an axle or spring should break. (See Fig. 3.)

Q Q, Fig. 1, are braces which help support the cable-track and also act to prevent the wheels S of suspended car from leaving the track.

U U represent guards over wheels S on elevated track.

$a$ in Figs. 6 and 7 represents steel pins or bars passing through edges of capstan-wheel D.

W represents the axle of the car or truck.

The object of my invention is the construction of a combined elevated and suspended cable-railroad system, which will embrace greater carrying capacity and conveniences, being less cumbersome with less obstruction to light and air, capable of running with higher speed and greater safety than any road heretofore known. My elevated structure is neater than present roads, being made of steel and iron, with no wood except about two inches directly under the track to give elasticity to the road.

I also have an improved track for both cable and car wheels. It is grooved, and a concrete or composition composed of five parts sifted sand, two parts sifted coal-ashes, and one part gas-house lime mixed with Liverpool tar is placed in the bottom, which deadens noise. The height of one side of the grooved track exceeds the other side and is a substitute for the flange on the ordinary car-wheel. The sides of the grooved track are also beveled slightly.

The flange on my track will be much higher than the flange on an ordinary car-wheel, and therefore a better safeguard against the car-wheels leaving the track; but, in addition to this, I erect substantial iron bars or posts as near as possible to the outside of the car-wheels on the elevated track and as high as the top of the car-wheels, or even higher, to which will be attached an iron railing, making it impossible for the wheels to leave the track. The top plate of this railing U may be extended over the car-wheels as near to them as possible without obstructing the movement of the cars, as shown in the drawings.

In the suspended tramway the braces Q Q, which support the cable, form a guard about two inches above the car-wheels, which makes it impossible for those wheels to leave the track.

I further provide against an accident in case a wheel or axle of the suspended car should break by extending iron bands or rods X X around the frame of the suspended car, bringing them near enough together at the top of the car to pass between the rails of the track N.

About two inches above the track N the rods are turned out in the form of elbows, which will extend over the track. These rods will be made sufficiently strong to hold the car, and are intended as a complete prevention to an accident. These elbows are made as axles, with small wheels b b. With this provision, if an axle, car wheel, or rods Y V Y, which attach the suspended car to the axle W, should break the car will move on with safety.

I do not confine myself to the elevated and suspended roads, as shown in the drawings, but may run girders across from post to post, as shown, and erect a conduit and tramway for cable and car tracks, and with long rods suspend cars nearly to the ground, in order to do the traffic of surface cars. In my combined improvements all the parts do double service, which makes my road of even cost and dimension of present roads to support three times their number of tracks, cars, and passengers.

My improved combined roads have three independent systems constructed on the same posts, one system directly above the other—the first for surface traffic, the second for faster local traffic, and the third or elevated system for through express passengers.

The lower or surface cars have their conduit and tramway constructed above ordinary street traffic, and the cable which propels the cars for the surface traffic and the conduit in which it travels extends up and down the line in longitudinal parallel lines, one strand or run of the cable traveling in one direction over or above the cars which it propels and the other in an opposite direction. This combination will give special conveniences for different localities, conditions, and dispositions of people, and avoid the delays and confusion of the present systems of carrying local and through passengers.

The cable and suspended car-trucks are in the same conduit with closed sides and top. The cable-trucks are just above the car-trucks. This conduit has a free opening from the bottom throughout the entire length of the road. This track or tramway opening at the bottom is based upon the same principle of my cable-track opening from the bottom, (see my patent No. 298,135,) only that the conduit is enlarged, so as to include the tramway or tracks and trucks of the cable and suspended cars.

The iron rods V, by which the lower cars are suspended, pass down from the axle through the open track the same as the metallic bars pass through the open track in patent No. 298,135.

A is a continuous wire rope placed upon trucks B, which trucks or wheels move upon their respective tracks. The said trucks B are provided as often as necessary to carry the said wire rope A, to which they are fastened.

R are pulleys placed at the end of each section of track, over which the endless wire rope passes and from which it receives its constant motion, the said pulleys being driven by means of an engine or any other way. Where wheels or trucks B are not needed to carry the cable, the clips c are clasped directly around the cable. (See Fig. 5.) Where the wheels or trucks B are located, the upper part of the box which goes around the axle is made with the lower part of the clasp which fastens the steel clips to the cable, and the cap which clasps the cable is fastened to the lower part of the boxing around the axle by four bolts, e, so that the same bolts fasten the clasp of the cable and the boxing around the axle together. The cap of the cable-clasp and the clip form one piece. (See Fig. 4.) In going one way the cable propels the cars on the upper or elevated track, and returning it propels the suspended cars, and in propelling the cars which are suspended near the ground the cable returns in a conduit constructed over the car, propelling the cars of that system both ways or in opposite directions with the same cable, while two cables will be used to propel the cars on the upper suspended and elevated roads, provided each of these roads has double tracks, and the cars of each of the upper cables will likewise travel in opposite directions.

The capstan or friction wheel D is made with a groove, and steel pins or bars a are put across the groove near the outer edges or circumference of the said capstan or friction wheel D, which wheel is adjusted on the car so that the metallic bars or steel clips e of the cable play into the groove of the capstan or friction wheel D between the steel pins a a, thus giving motion to the capstan or friction wheel D when the cable moves. The steel clips on the cable play into the groove and against the steel pins or bars of the capstan or friction-wheel D in the same manner or on the same principle of cog-wheels. A plan view of my capstan-wheel D is shown in Fig. 6.

$ff$ is a suitable frame in which my capstan or friction-wheel is held. (See Fig. 7.)

T is a shoulder to hold the large capstan-wheel D in place. The capstan-wheel D is grooved and steel pins $a$ are passed across the groove.

L is the disk, which is pressed against the capstan-wheel D by means of the cog screw or nut K. When the friction is lightly applied to the capstan-wheel D, the car moves slowly, and as the friction is increased the speed of the car is increased, and when the friction is applied so as to stop the revolution of the capstan-wheel D the car moves with the same speed as the cable A. When the friction is removed and the car-wheel brake applied, the car stops; but the capstan or friction wheel D continues to revolve without affecting the car until the friction is again applied.

Instead of attaching the crank directly to the screw K, as in my patent for propelling canal-boats, No. 298,135, I attach the crank or handle F to a cog-wheel, H, whose cogs mesh into the cogs on the head of the screw K, to apply the friction to the capstan-wheel D, which is attached to the upper car. On the suspended cars I use two wheels, the first wheel, H, working or meshing into the cogs of the second wheel, I, and the second wheel, I, meshing into cogs on the head of the screw K, which works the friction-disk L. This is done in order to work the capstan-wheel D conveniently.

The track or tramway on which the trucks of the cable run is made on the same plan as the car-track—viz., a grooved track, the outer sides of which are much higher than the inner, and both sides of which are beveled slightly to prevent the wheel from rubbing against the side of said track. The composition or concrete which I use in the groove of car-track to deaden sound will also be placed in the grooved track in which the wheels of the cable run. If desired, I may use leather or rubber in the grooved track over the concrete or composition, especially in the inclosed conduit. The edges of the car and cable wheels are both beveled to prevent their rubbing against and climbing the grooved track.

In Fig. 2, Y V Y represent the three rods which will be used to suspend the car, instead of one rod, V, as represented in the other figures of the drawings. In Fig. 2 I also show the springs Z Z on top of the car and how the car is suspended by attaching the rods Y V Y to the springs Z Z. None of these things are shown fully in the other figures.

In Fig. 6, C represents any standard, post, or frame to support driving-wheel R. $g$ represents standards or frames to support cog-wheels H and I. $h$ represents axle-boxing. $b\ b$ represent small wheels on elbows of bands X X.

Fig. 7 represents a plan view of my improved capstan or friction wheel.

Fig. 5 represents a section of the cable.

Fig. 4 represents a plan view of trucks B, clips C, cable A, and axle-boxing $h$.

Fig. 3 represents side and end view of the manner in which bands X X are attached to car and pass up between rails of track, turning out in form of elbows, to which are attached small wheels $b\ b$.

Figure 6:
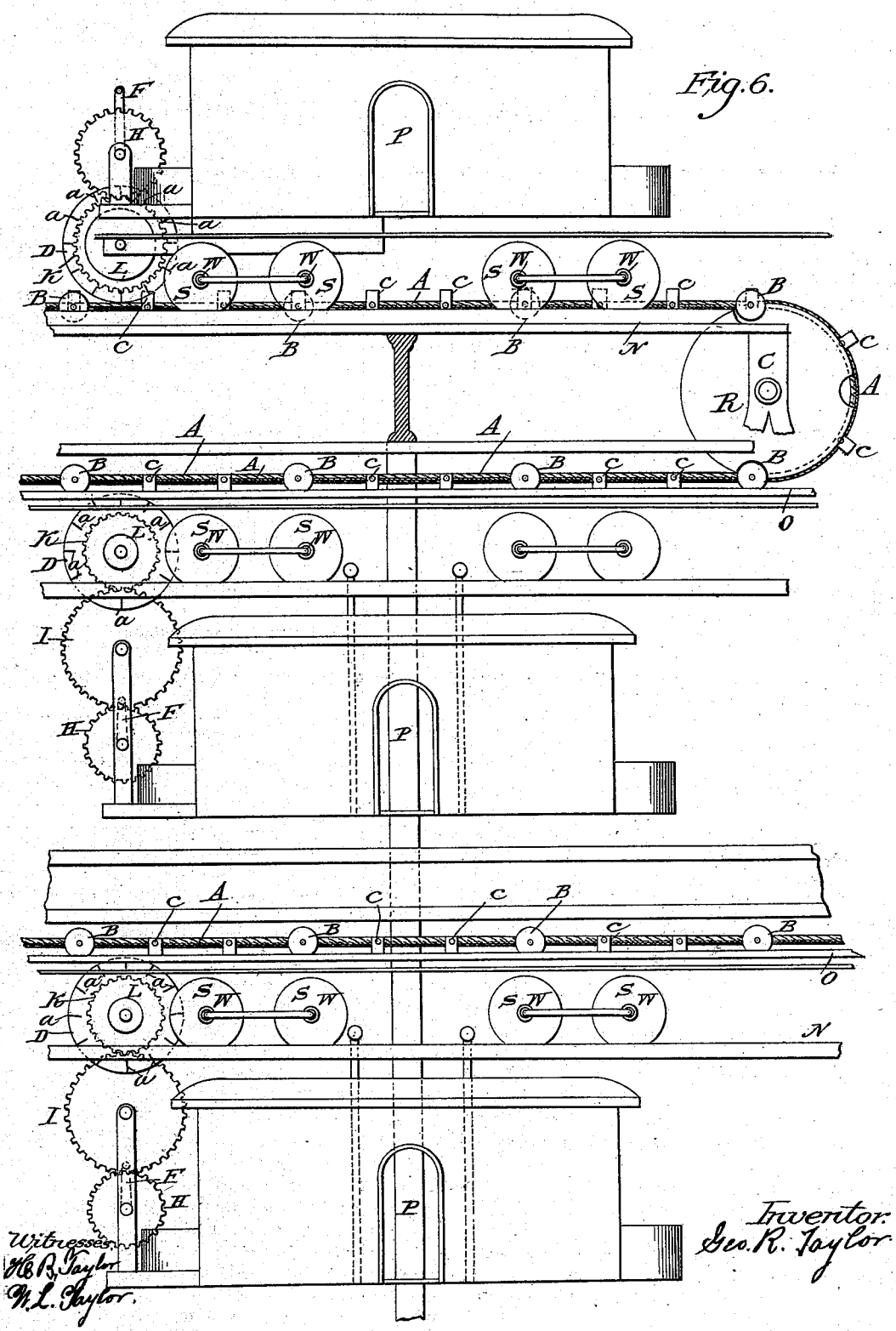
Fig. 6 represents a side view of a twofold combined elevated and suspended cable railroad.

In Fig. 7 the capstan or friction-wheel D, the shoulder T, and disk L all rest upon a shaft or axle, E, extending through their centers. The ends of the shaft or axle rest in the frame $ff$, and this frame is attached firmly to the car. At one end of the axle E a thread is cut on said axle extending from the disk L through one side of the frame to cog-wheel or nut K. A long round nut is screwed onto the axle where the thread is cut. This nut may be several inches thick, (from thread of the axle to circumference of nut,) and passes through one side of the frame $ff$ to the disk L. A very little tightening of the nut causes it to push against the disk L and the disk L against the friction-wheel D, (the friction-wheel D being held firmly by shoulder T,) which produces the friction and impedes the rotation of the friction-wheel D. In proportion as the nut is tightened the friction-wheel is impeded and propelling-power is given to the car. Thus the movement of the car is regulated by operating the nut. The nut is operated by means of a cog-wheel on the end of said nut, which I have called a "cog-screw," K; but it is rather a cog-wheel upon the end of the nut. In Fig. 6 the lower suspended cars, which do the traffic of surface cars, are suspended from a separate girder or truss-work running across from post to post under the upper suspended cars. The cars on the lower suspended road will be propelled by an independent cable when the three roads are operated. I expect the roads will be constructed with double tracks; but as only single tracks are illustrated the return-cable is not shown in the drawings of the lower suspended road. Should only two roads be operated at the same time, the cable would turn on a vertical wheel, as shown in the elevated and upper suspended roads of the drawings, (see Fig. 1, and top of Fig. 6,) propelling the cars of two roads in opposite directions.

Fig. 3 represents an end view of a car with iron bands or rods, described hereinbefore. The car is suspended directly under the track with a continuous open space between the rails. X X represent an iron band or rod with right angles about four inches from each end, with axles and small wheels $b\ b$ on each end of the four-inch angles. These bands extend around the frame of the car near each end and up between the rails of the tracks, so that these two ends with the four-inch angles, including the axles and small wheels, come about two inches above each track. These bands are fastened to the frame of the car. The car is regularly suspended by rods Y V Y to the axles or trucks of the cars, and these bands X X only come into use when a car wheel or axle breaks, as has been before stated.

Fig. 8 represents an end view and a view of a section of a beveled wheel.

Fig. 9 gives a side view of a car suspended from axle W, and also gives a view of bands or rods X X and small wheels b b.

Fig. 10 represents a plan view of driving-wheel R, which is grooved and has recesses to receive the axle of trucks to prevent the cable from slipping.

Having thus described my invention, what I claim as new, and wish to secure by Letters Patent, is—

1. In a combined elevated and suspended cable-railroad system, a threefold combination, to wit: one elevated and two suspended cable railroads constructed on a double set of posts connected by transverse and longitudinal girders, in combination with tracks O and N, standards C, supporting driving-wheel R, and the endless driving-cable A, provided with clips C, trucks B, and axle-boxing h h, the said cable being arranged to propel one upper and one suspended line, as described, and for purposes specified.

2. In a combined elevated and suspended cable-railroad system, the capstan or friction-wheel D, provided with a groove and steel pins or bars a, in combination with the shoulder T, disk L, axle or shaft E, frames f f, and cogged screw and nut K, to regulate friction, as described, and for purposes specified.

3. In a combined elevated and suspended cable-railroad system, the capstan or friction-wheels D and D' in frame f f, in combination with shoulder T, disk L, cog-screw and nut K, with cable A, clips C, and trucks B, as described, and for purposes specified.

4. In a combined elevated and suspended cable-railroad system, the wheels H and I, in combination with cog-screw and nut K and capstan-wheel D, as described, and for purposes specified.

5. In a combined elevated and suspended cable-railroad system, the conduit with closed sides and top and open bottom, in combination with cable-track O and car-track N, with groove M in each, and braces Q Q, as described, and for purposes specified.

6. In a combined elevated and suspended cable-railroad system, the half-springs Z Z, in combination with the iron rods Y V Y, axle W, and car, as described, and for purposes specified.

7. In a combined elevated and suspended cable-railroad system, a railroad and cable track grooved, beveled, and filled with composition or concrete composed of sand, coal-ashes, gas-house lime, and Liverpool tar, as described, and for purposes specified.

8. In a combined elevated and suspended cable-railroad system, a grooved railroad and cable track inlaid with composition, in combination with leather or rubber, as described, and for purposes specified.

9. In a combined elevated and suspended cable-railroad system, braces Q Q, in combination with conduit or tramway, car-wheels S S, and suspended cars, as described, and for purposes specified.

10. In a combined elevated and suspended cable-railroad system, iron bands or rods X X, passing around the frame of the suspended car and up between and over the rails of the suspended track, in combination with the elbows and small wheels b b, as described, and for purposes specified.

GEORGE R. TAYLOR.

Witnesses:
M. E. TAYLOR,
F. B. REYNOLDS.